(12) United States Patent
Gou et al.

(10) Patent No.: US 9,173,194 B2
(45) Date of Patent: Oct. 27, 2015

(54) METHOD AND SYSTEM FOR TRANSMITTING MBMS CONTROL INFORMATION IN MULTICARRIER AGGREGATION SYSTEM

(75) Inventors: Wei Gou, Shenzhen (CN); Zijiang Ma, Shenzhen (CN); Bin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 61 days.

(21) Appl. No.: 14/126,158

(22) PCT Filed: Jun. 18, 2012

(86) PCT No.: PCT/CN2012/077111
§ 371 (c)(1),
(2), (4) Date: Dec. 13, 2013

(87) PCT Pub. No.: WO2012/175008
PCT Pub. Date: Dec. 27, 2012

(65) Prior Publication Data
US 2014/0126457 A1    May 8, 2014

(30) Foreign Application Priority Data
Jun. 20, 2011 (CN) .......................... 2011 1 0165672

(51) Int. Cl.
*H04W 72/00* (2009.01)
*H04L 12/18* (2006.01)
(Continued)

(52) U.S. Cl.
CPC ............. *H04W 72/005* (2013.01); *H04L 5/001* (2013.01); *H04L 5/0053* (2013.01); *H04L 12/189* (2013.01); *H04W 48/12* (2013.01)

(58) Field of Classification Search
CPC .... H04W 72/005; H04W 48/12; H04L 5/001; H04L 5/0053; H04L 12/189
See application file for complete search history.

(56) References Cited

U.S. PATENT DOCUMENTS

2011/0013550 A1* 1/2011 Wu ............................... 370/312
2011/0053490 A1   3/2011 Wu
(Continued)

FOREIGN PATENT DOCUMENTS

| CN | 102006559 A | 4/2011 |
|---|---|---|
| CN | 102083004 A | 6/2011 |
| JP | 2007516657 A | 6/2007 |

OTHER PUBLICATIONS

International Search Report in international application No. PCT/CN2012/077111, mailed on Sep. 27, 2012.
(Continued)

*Primary Examiner* — Jay P Patel
(74) *Attorney, Agent, or Firm* — Oppedahl Patent Law Firm LLC

(57) ABSTRACT

A method and system for transmitting Multimedia Broadcast Multicast Service (MBMS) control information in a multicarrier aggregation system are disclosed in embodiments of the disclosure. The method includes that: when an MBMS needs to be sent, a network side determines an MBMS-including Component Carrier (CC) and a non-MBMS-including CC, and sends service control information and service data of the MBMS in the MBMS-including CC. The method further includes that: the network side sends, in the non-MBMS-including CC, related control information of the MBMS in the MBMS-including CC. With technical solutions provided by the embodiments of the disclosure, a UE operating or residing in a non-MBMS-including CC can find out timely and accurately the initiation of a session for a UE-interested MBMS in an MBMS-including CC, so as to avoid premature blind gathering of UEs in the MBMS-including CC, thus effectively decreasing duration of impact on uplink random access by the MBMS-including CC.

16 Claims, 1 Drawing Sheet

(51) Int. Cl.
*H04L 5/00* (2006.01)
*H04W 48/12* (2009.01)

(56) References Cited

U.S. PATENT DOCUMENTS

2012/0213141 A1* 8/2012 Damnjanovic ............... 370/312
2012/0236776 A1* 9/2012 Zhang et al. ................ 370/312

OTHER PUBLICATIONS

English Translation of the Written Opinion of the International Search Authority in international application No. PCT/CN2012/077111, mailed on Sep. 27, 2012.
3GPP TSG-RAN WG2 #69bis, HTC, MBMS in Carrier Aggregation, Beijing, Apr. 12, 2010, 2 total pages, see International Search Report.
3GPP TSG-RAN WG2 Meeting #74, MBMS Service discovery in Carrier aggregation deployment, R2-112897, ZTE, Potevio, Barcelona, Spain, May 3, 2011.
3GPP TSG-RAN WG2 Meeting #74, Definition of service continuity and UE minimum capability, R2-112901, ZTE, Potevio, Barcelona, Spain, May 3, 2011.
3GPP TSG-RAN WG2 Meeting #73bis, Issues of MBMS service provision under CA, R2-112229, Alcatel-Lucent Shanghai Bell, Alcatel-Lucent, Shanghai, China, Apr. 4, 2011.
3GPP TSG-RAN WG2 Meeting #74, MBMS Service Continuity for UEs in RRC-IDLE Mode, R2-113195, ITRI, Barcelona, Spain, May 3, 2011.
3GPP TSG-RAN2 Meeting #69, Correction to MBMS terminology, R2-101809, Ericsson, ST-Ericsson, San Francisco, USA, Feb. 22, 2010.

\* cited by examiner

METHOD AND SYSTEM FOR TRANSMITTING MBMS CONTROL INFORMATION IN MULTICARRIER AGGREGATION SYSTEM

TECHNICAL FIELD

The disclosure relates to technology for transmitting a Multimedia Broadcast Multicast Service (MBMS) in a multicarrier aggregation system, and in particular to a method and system for transmitting MBMS control information in a multicarrier aggregation system.

BACKGROUND

Along with the rapid development of Internet technology and the popularity of large-screen multi-function mobile phones, a large number of mobile data multimedia services and a variety of high-bandwidth multimedia services appear, such as video conferences, television broadcasting, videos on demand, video advertisements, online education and interactive games. This not only meets increasing service requirements of mobile subscribers, but also brings new service growth points to mobile operators. These mobile data multimedia services require that same data may be received simultaneously by multiple subscribers. Therefore, compared with ordinary data services, these mobile data multimedia services are characterised by larger data volumes, long durations and sensitivity to time delays. In order to utilize mobile network resources effectively, a 3rd Generation Partnership Project (3GPP) proposes an MBMS which is a technique for transmitting data from one data source to multiple targets, and thereby implementing network resource sharing as well as increasing the utilization rate of network resources, especially the utilization rate of air interface resources. Here, the network includes a core network and an access network. The MBMS defined by the 3GPP not only can multicast and broadcast a plain-text low-speed type of messages, but also can multicast and broadcast high-speed multimedia services, providing multiple rich video, audio and multimedia services. This undoubtedly meets a trend of future development of mobile data, and provides better service prospects to development of 3rd Generation (3G) mobile communications.

In a Long Term Evolution-Advanced (LTE-A) system, multicarrier aggregation technology is introduced. The multicarrier aggregation technology refers to that: one geographic location is covered by multiple carriers with different frequencies, wherein these carrier frequencies can be either continuous or discrete; and a network side sends data to one User Equipment (UE) simultaneously using two or more carriers, and the UE receives the data on the two or more carriers. At present, the multicarrier aggregation technology stipulated in a protocol includes that:

each UE supports aggregation of at least two Component Carriers (CCs);

a network side allocates the CCs to the UE, and indicates which CC is a Primary Cell (Pcell) of the UE and which CC/CCs is/are Secondary Cell/Cells (Scell/Scells) of the UE;

a UE in an idle state resides in its own Pcell;

the Pcell is always in an activated state;

the network side can close (namely, deactivate) and open (namely, activate) an Scell of the UE;

the UE does not receive a message in a Physical Downlink Control Channel (PDCCH) in a closed Scell;

the UE does not receive a message in a Physical Downlink Shared Channel (PDSCH) in a closed Scell;

the UE does not measure a Channel Quality Indicator (CQI) of a downlink carrier in a closed Scell;

an initial default state of an Scell is "deactivated";

the UE receives a Broadcast Control Channel (BCCH) message and a Paging message only in the Pcell; and the UE does not search a public search area of the PDCCH in an Scell.

It can be seen from the above description that, in existing multicarrier aggregation technology, an MBMS is sent using only one CC, mainly to simplify standardized work load and accelerate a standard progress. However, this will lead to premature blind gathering of UEs in an MBMS-including CC, and to increased duration of impact on uplink random access by the MBMS-including CC, thus causing degradation of system performance. For example, assume that there are three CCs, denoted as a CC 1, a CC 2 and a CC 3 respectively, in a multicarrier aggregation system, and an MBMS is provided only in the CC 1. A problem caused by sending the MBMS only in one CC in the multicarrier aggregation system is analyzed below.

A UE accesses the multicarrier aggregation system by randomly selecting a certain CC. Therefore, in theory, the chance of access of the UE by each CC is equal and there are a mean number of UEs accessing by each CC. A network side may learn information on a UE in a Radio Resource Control (RRC) connection state in real time. For example, the network side may learn the CC in which the UE is located. Therefore, the network side can schedule a UE in the RRC connection state to operate in a certain CC as needed, so as to balance the load in each CC. However, as the network side is not able to learn the CC in which a UE in an idle state is located, the network side cannot schedule such a UE into a certain CC. In other words, the UE may not learn in time whether an MBMS currently being transmitted in the MBMS-including CC is an MBMS the UE is interested in. And when the UE receives a notification and gathers to the MBMS-including CC, the UE finds that the MBMS currently being transmitted in the MBMS-including CC is not an MBMS the UE is interested in, leading to the phenomenon of premature gathering of UEs in the MBMS-including CC, which potentially increases duration of impact on uplink random access by the MBMS-including CC. Namely, a probability of a conflict in uplink random access is increased. In addition, in related art, a UE operating or residing in the CC 2 or the CC 3 is not able to learn accurately and timely that the MBMS the UE is interested in has begun to be sent in the CC 1, so that the UE cannot operate or reside in the CC 1 in time to begin to receive the MBMS the UE is interested in.

SUMMARY

In view of this, embodiments of the disclosure are intended to provide a method and system for transmitting MBMS control information in a multicarrier aggregation system, capable of enabling a UE operating or residing in a non-MBMS-including CC to find out timely and accurately the initiation of a session for a UE-interested MBMS in an MBMS-including CC.

To this end, a technical solution of an embodiment of the disclosure is implemented as follows.

A method for transmitting MBMS control information in a multicarrier aggregation system is provided by an embodiment of the disclosure, which includes: when an MBMS is sent, a network side determines an MBMS-including Component Carrier (CC) and a non-MBMS-including CC, and sends service control information and service data of the MBMS in an MBMS-including CC. The method further includes:

the network side sends in the non-MBMS-including CC, related control information of the MBMS in the MBMS-including CC.

In the aforementioned solution, when the related control information is sent, the method may further include:

the network side sends, in the non-MBMS-including CC, the related control information at a time which is no later than a time when the network side sends, in the MBMS-including CC, the service control information.

In the aforementioned solution, the related control information may include Multicast Control Channel (MCCH) information; and the related control information may be sent at the same time when the service control information is sent.

In the aforementioned solution, the related control information may further include Multicast Channel Scheduling Information (MSI).

In the aforementioned solution, the related control information may include: session information of an MBMS that is about to begin, and/or session information of an MBMS that just begins; and a period for modifying the related control information may be the same as a period for modifying the service control information.

In the aforementioned solution, when the related control information is sent, the method may further include:

the network side adds an identifier in the non-MBMS-including CC to indicate that only the related control information of the MBMS is transmitted on the non-MBMS-including CC.

In the aforementioned solution, the method may further include:

a User Equipment (UE) determines, according to the related control information received by the UE, whether to receive the MBMS.

In the aforementioned solution, the network side may be a Multi-cell/multicast Coordination Entity (MCE), or a base station, or a relay station.

A system for transmitting MBMS control information in a multicarrier aggregation system is provided by an embodiment of the disclosure, which includes: a network side configured to: when an MBMS needs to be sent, determine an MBMS-including Component Carrier (CC) and a non-MBMS-including CC, and send service control information and service data of the MBMS in the MBMS-including CC, wherein the network side is further configured to: when an MBMS is sent, send, in the non-MBMS-including CC, related control information of the MBMS in the MBMS-including CC.

In the aforementioned solution, a time when the related control information is sent may be no later than a time when the service control information is sent in the MBMS-including CC.

In the aforementioned solution, the network side may be further configured to: when the related control information is sent, add an identifier in the non-MBMS-including CC to indicate that only the related control information of the MBMS is transmitted on the non-MBMS-including CC.

In the aforementioned solution, the system may further include: a UE configured to determine according to the related control information received by the UE whether to receive the MBMS.

With a method and system for transmitting MBMS control information in a multicarrier aggregation system provided by the embodiments of the disclosure, when an MBMS is sent, a network side sends service control information and service data of the MBMS in an MBMS-including CC, and sends, in a non-MBMS-including CC, related control information of the MBMS in the MBMS-including CC. After the related control information is received by a UE, the UE determines according to the related control information whether to receive the MBMS. Thus, a UE operating or residing in a non-MBMS-including CC is allowed to find out timely and accurately the initiation of a session for a UE-interested MBMS in an MBMS-including CC, such that premature blind gathering of UEs operating or residing in a non-MBMS-including CC in the MBMS-including CC can be prevented, thereby effectively decreasing duration of impact on uplink random access by the MBMS-including CC, namely, effectively reducing a probability of a conflict in uplink random access and improving system performance.

In addition, the related control information may be session information of an MBMS that is about to begin, and/or session information of an MBMS that just begins, so as to reduce a signalling overhead and further improve the system performance.

DETAILED DESCRIPTION

According to embodiments of the disclosure, when an MBMS needs to be sent, a network side determines an MBMS-including CC and a non-MBMS-including CC; when the network side sends the MBMS, the network side sends service control information and service data of the MBMS in the MBMS-including CC, and the network side sends, in the non-MBMS-including CC, related control information of the MBMS in the MBMS-including CC instead of the service data; further, an identifier can be added in a corresponding CC to indicate whether only the related control information, but not the service data, of the MBMS is transmitted on the corresponding CC.

The disclosure is further elaborated below with reference to the drawings and specific embodiments.

Figure 1:
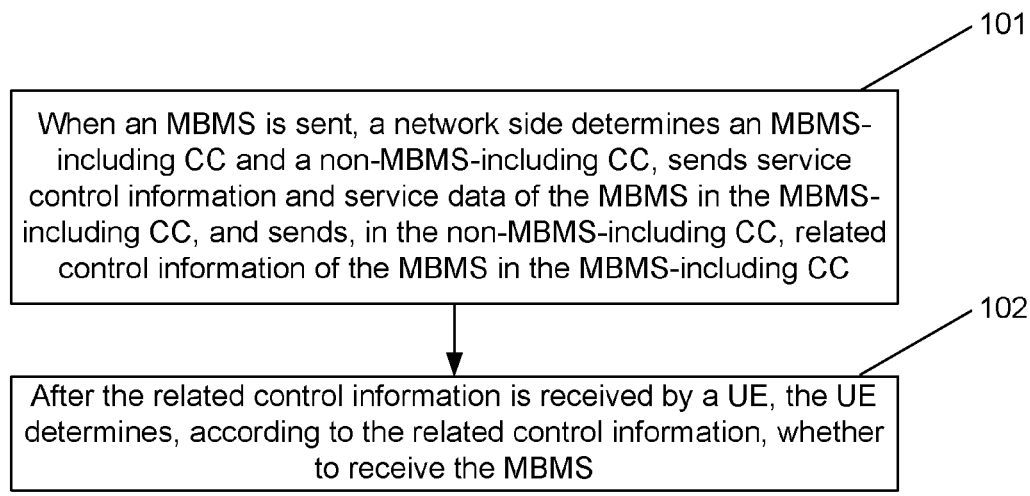
FIG. 1 is a flowchart of a method for transmitting MBMS control information in a multicarrier aggregation system according to an embodiment of the disclosure.

A method for transmitting MBMS control information in a multicarrier aggregation system according to an embodiment of the disclosure, as shown in FIG. 1, includes the following steps.

Step 101: When an MBMS is sent, a network side determines an MBMS-including CC and a non-MBMS-including CC, sends service control information and service data of the MBMS in the MBMS-including CC, and sends, in the non-MBMS-including CC, related control information of the MBMS in the MBMS-including CC.

Here, the MBMS refers to data in a Multicast Traffic Channel (MTCH) mapped onto, and transmitted in, a Physical Multicast Channel (PMCH), the MBMS includes service control information and service data, and the service control information includes MCCH information and MSI.

The non-MBMS-including CC refers to a CC on which data service of an MBMS are not sent.

The related control information is used to indicate whether an MBMS the UE is interested in starts to be sent. The related control information may include the MCCH information. Further, the related control information may include the MSI, wherein the MSI is used to indicate a specific subframe in which each service is sent.

Specifically, in an actual application, given that in a multicarrier system, rigorous downlink synchronization of all CCs of the same base station or cell generally can be implemented easily, in which case, the related control information may be the same as the service control information sent in the MBMS-including CC, and the related control information may be sent at the same time when the service control information is sent, namely, the related control information and the service control information may have the same sending period, the same modifying period, the same frame offset, the same subframe number, the same Modulation and Coding Scheme (MCS) and the like, wherein the service control information includes MCCH information and MSI. Likewise, the related control information includes the MCCH information and the MSI. In this case, the related control information may also be the same as the MCCH information of the service control information sent in the MBMS-including CC, and the related control information is sent at the same time when the service control information is sent. In this case, the related control information includes the MCCH information.

In an actual application, the related control information may also be session information of an MBMS that is about to begin and/or session information of an MBMS that just begins, so as to reduce content of the related control information sent in a non-MBMS-including CC, and therefore reduce a signalling overhead. Further, the period for modifying the related control information sent is the same as a period for modifying the service control information sent. Wherein, the MBMS that is about to begin refers to an MBMS of which the network side has configured MCCH change notification information; as the service control information of the MBMS is sent and configured a long time in advance (at least one MCCH modifying period in advance), the MBMS that is configured with the MCCH change notification information is referred to as the MBMS that is about to begin, and the session information of the MBMS that is about to begin may specifically be the MCCH change notification information. The session information of an MBMS that just begins refers to a session of an MBMS started by the network side shortly, for example, several MCCH modifying periods. In other words, the session information of an MBMS that just begins refers to session information of an MBMS that is just started. Here, the duration for sending the session information of an MBMS that is about to begin and/or the session information of an MBMS that just begins can be set as needed, for example, as five MCCH modifying periods.

In order to ensure that a UE operating or residing in a non-MBMS-including CC can have enough time to adjust itself to receive in an MBMS-including CC an MBMS the UE is interested in after the related control information is received by the UE, the method may further include that:

the network side sends, in the non-MBMS-including CC, the related control information at a time which is no later than a time when the network side sends, in the MBMS-including CC, the service control information.

When the related control information is sent, the method may further include that:

the network side adds an identifier in the non-MBMS-including CC to indicate that only the related control information of the MBMS is transmitted on the non-MBMS-including CC.

The network side may specifically be a Multi-cell/multicast Coordination Entity (MCE), or a base station, or a relay station.

Step 102: After the related control information is received by a UE, the UE determines, according to the related control information, whether to receive the MBMS.

Specifically, the UE can determine, according to the related control information, whether the MBMS is an MBMS the UE is interested in. When it is determined that the MBMS is an MBMS the UE is interested in, the UE adjusts itself to receive the MBMS in a CC including the MBMS. When it is determined that the MBMS is not an MBMS the UE is interested in, the UE takes no action. Wherein, a specific processing process that a UE determines whether the MBMS is an MBMS the UE is interested in, as well as a specific processing process that a UE adjusts itself to receive the MBMS in a CC including the MBMS, are prior art, which are not repeated here.

The disclosure is further elaborated below with reference to specific embodiments.

Specific Embodiment 1:

An application scene of the embodiment is that: there are three CCs denoted respectively as a CC 1, a CC 2 and a CC 3 in a multicarrier aggregation system. Only the CC 1 is selected as the CC on which an MBMS including service data and service control information is transmitted, and no service data of the MBMS is transmitted on the CC 2 and the CC 3. Here, the service control information includes MCCH information and MSI.

With the method of the embodiment of the disclosure, a network side transmits service control information and MBMS data of an MBMS in the CC1; and instead of sending the MBMS data, the network side sends, in the CC 2 and the CC 3, just related control information of the MBMS in the CC 1. Here, the related control information includes MCCH information and MSI. Thus, a UE operating or residing in the CC 1 can receive normally an MBMS the UE is interested in according to the related control information received. Likewise, a UE operating or residing in the CC 2 or the CC 3 gathers in the CC 1 according to the related control information received, and can thus receive an MBMS the UE is interested in accurately and timely.

The network side processes the related control information sent in the CC 2 and the CC 3 as follows, so as to achieve optimal effect.

The related control information sent in the CC 2 and the CC 3 is identical with the service control information sent in the CC 1, namely, both the related control information and the service control information include the MCCH information and the MSI with the same content and position. Furthermore, the related control information sent in the CC 2 and the CC 3 is strictly synchronized with the service control information sent in the CC 1, namely, having the same sending period, the same modifying period, the same frame offset, the same subframe number, the same MCS and the like. In other words, the same configuration is used for sending the related control information in the CC 2 and the CC 3 and for sending the service control information in the CC 1. Therefore, the network side does not need to perform configuration related to the related control information sent in the CC 2 and the CC 3, and can directly use the configuration for sending the service control information in the CC 1, thus simplifying implementation of the network side.

Meanwhile, in order to ensure the timeliness of the related information, the network side sends, in the CC 2 and the CC 3, the related control information at a time no later than a time when the service control information is sent in the CC 1, so as to leave a certain period of time for a UE to receive in the CC 1 an MBMS the UE is interested in. In the embodiment, as the related control information sent in the CC 2 and the CC 3 is identical with the service control information sent in the CC 1, the time spent sending the related control information in the CC 2 and the CC 3 by the network side is identical with the time spent sending the service control information in the CC 1.

In addition, the network side needs to add an identifier in each CC to indicate whether the CC includes an MBMS including service data and service control information or the CC includes only the related control information of the MBMS. The identifier may be designed flexibly as needed, as long as the identifier can indicate what a CC serves for, with flexible specific design of the identifier serving for the same purpose, namely, indicating that the CC includes an MBMS including service data and service control information or includes only the related control information of the MBMS. This is implemented in the embodiment by adding an indicator in BCCH information in each CC. Specifically, the indicator is added in the BCCH information in a CC including an MBMS including service data and service control information, so as to indicate that the CC is a CC including an MBMS including service data and service control information, whereas no indicator is added in BCCH information in other CCs including no MBMS including service data and service control information. Namely, an indicator is added in the BCCH information in the CC 1, and no indicator is added in the BCCH information in the CC 2 and the CC 3.

Specific Embodiment 2:

An application scene of the embodiment is that: there are three CCs denoted respectively as a CC 1, a CC 2 and a CC 3 in a multicarrier aggregation system. Only the CC 1 is selected as the CC on which an MBMS including service data and service control information is transmitted, and no service data of the MBMS is transmitted on the CC 2 and the CC 3. Here, the service control information includes MCCH information and MSI.

With the method of the embodiment of the disclosure, a network side transmits service control information and MBMS data of an MBMS in the CC1; and instead of sending the MBMS data, the network side sends, in the CC 2 and the CC 3, only related control information of the MBMS in the CC 1. Here, the related control information is MCCH information. Thus, a UE operating or residing in the CC 1 can receive normally an MBMS the UE is interested in according to the related control information received. Likewise, a UE operating or residing in the CC 2 or the CC 3 gathers in the CC 1 according to the related control information received, and can thus receive accurately and timely an MBMS the UE is interested in.

The network side processes the related control information sent in the CC 2 and the CC 3 as follows, so as to achieve optimal effect.

The related control information sent in the CC 2 and the CC 3 is session information of an MBMS that is about to begin, so as to decrease content of the related control information sent in the CC 2 and the CC, and thus reduce a signalling overhead.

The network side sends, in the CC 2 and the CC 3, the related control information at a time that is earlier than a time when the service control information is sent in the CC 1 by an unlimited amount of time, which can be determined according to the time point of the service control information configured by the network side. Before the related control information is sent, a sending period, a frame offset and a subframe number of the respective related control information need to be configured in advance on the CC 2 and the CC 3 to implement sending of the related control information. However, a period for modifying the related control information configured in the CC 2 and the CC 3 must be synchronized with a period for modifying the service control information configured in the CC 1. Namely, the period for modifying the related control information sent is the same as the period for modifying the service control information sent. The related control information sent by the network side in the CC 2 and the CC 3 may lasts for only several MCCH modifying periods. Here, the number of MCCH modifying periods for which the related control information sent lasts can be set as needed. For example, the related control information sending may last five MCCH modifying periods. Wherein, the reason that the related control information sent by the network side in the CC 2 and the CC 3 lasts for only several MCCH modifying periods is that: when the related control information sending lasts too long a duration, the information is no longer session information of an MBMS that is about to begin.

The network side adds in the CC 1 an identifier indicating that the CC 1 includes an MBMS, and the network side adds no such identifier in the CC 2 or the CC 3. Alternatively, the network side adds in a non-MBMS-including CC an identifier indicating that the CC (CC 2 or CC 3) includes no MBMS but just the related control information, and the network side adds no such identifier in the CC 1.

Specific Embodiment 3:

An application scene of the embodiment is that: there are three CCs denoted respectively as a CC 1, a CC 2 and a CC 3 in a multicarrier aggregation system. Only the CC 1 is selected as the CC on which an MBMS including service data and service control information is transmitted, and no service data of the MBMS is transmitted on the CC 2 and the CC 3. Here, the service control information includes MCCH information and MSI.

With the method of the embodiment of the disclosure, a network side transmits service control information and MBMS data of an MBMS in the CC1; and instead of sending the MBMS data, the network side sends, in the CC 2 and the CC 3, only related control information of the MBMS in the CC 1. Thus, a UE operating or residing in the CC 1 can receive normally an MBMS the UE is interested in according to the related control information received. Likewise, a UE operating or residing in the CC 2 or the CC 3 gathers in the CC 1 according to the related control information received, and can thus receive accurately and timely an MBMS the UE is interested in.

The network side processes the related control information sent in the CC 2 and the CC 3 as follows, so as to achieve optimal effect.

the related control information sent in the CC 2 and the CC 3 includes session information of an MBMS that is about to begin and/or begins transmitted in the CC 1, so as to reduce a signalling overhead of the related control information sent in a non-MBMS-including CC. Wherein, if the related control information transmitted in the CC 2 and the CC 3 is only session information of an MBMS that is about to begin and/or begins, then the related control information sent by the network side in the CC 2 and the CC 3 may last for only several MCCH modifying periods. Here, the number of MCCH modifying periods for which the related control information sent lasts can be set as needed. For example, the related control information sending may last five MCCH modifying periods. Wherein, the reason that the related control information sent by the network side in the CC 2 and the CC 3 lasts for only several MCCH modifying periods is that: when the related control information sending lasts too long a duration, the information is no longer session information of an MBMS that is about to begin or session information of an MBMS that just begins.

The network side sends, in the CC 2 and the CC 3, the related control information at a time that is earlier than a time when the service control information is sent in the CC 1 by an unlimited amount of time, which can be determined according to the time point of the service control information configured by the network side. Before the related control information is sent, a sending period, a frame offset and a subframe number of the respective related control information need to be configured in advance on the CC 2 and the CC 3 to implement sending of the related control information. However, a period for modifying the related control information configured in the CC 2 and the CC 3 must be synchronized with a period for modifying the service control information configured in the CC 1. Namely, the period for modifying the related control information sent is the same as the period for modifying the service control information sent.

The network side adds in the CC 1 an identifier indicating that the CC 1 includes an MBMS, and the network side adds no such identifier in the CC 2 or the CC 3. Alternatively, the network side adds an identifier respectively in CC 2 and CC 3 to indicate that the CC 2 and the CC 3 include no MBMS but just the related control information, and the network side adds no such identifier in the CC 1.

Figure 2:
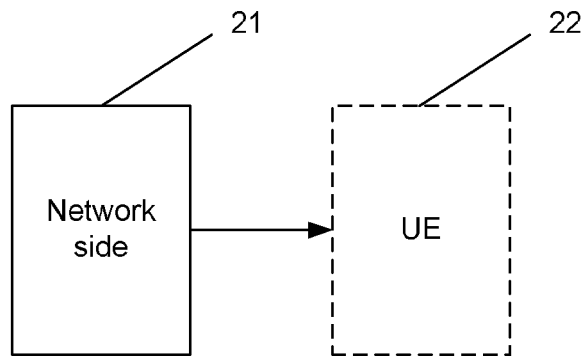
FIG. 2 is a schematic diagram of a structure of a system for transmitting MBMS control information in a multicarrier aggregation system according to an embodiment of the disclosure.

In order to implement the aforementioned method, an embodiment of the disclosure further provides a system for transmitting MBMS control information in a multicarrier aggregation system. As shown in FIG. 2, the system includes a network side 21 configured to: when an MBMS is sent by the network side 21, send, in a non-MBMS-including CC, related control information of the MBMS in an MBMS-including CC.

When the related control information is sent by the network side 21, the network side 21 is further configured to: determine an MBMS-including CC and a non-MBMS-including CC, and send service control information and service data of an MBMS in the MBMS-including CC.

When the related control information is sent, the network side 21 is further configured to add an identifier in the non-MBMS-including CC to indicate that only the related control information of the MBMS is transmitted on the non-MBMS-including CC.

The system may further include a UE 22 configured to, after the related control information is received by the UE 22, determine according to the related control information whether to receive the MBMS.

Here, the network side may specifically be an MCE, or a base station, or a relay station.

Specific processing processes of the network side and the UE in the system according to an embodiment of the disclosure have been described hereinbefore, which are not repeated.

The above are only some embodiments of the disclosure, which are not intended to limit the scope of protection of the disclosure.

The invention claimed is:

1. A method for transmitting Multimedia Broadcast Multicast Service (MBMS) control information in a multicarrier aggregation system, comprising: when an MBMS is sent, determining, by a network side, an MBMS-including Component Carrier (CC) and a non-MBMS-including CC, and sending service control information and service data of the MBMS in the MBMS-including CC; wherein the method further comprising:

sending, by the network side, in the non-MBMS-including CC, related control information of the MBMS in the MBMS-including CC, wherein the related control information is used for indicating whether an MBMS a User Equipment (UE) is interested in starts to be sent; and the method further comprising: when the service control information and the service data are sent, adding, by the network side, an identifier in the MBMS-including CC to indicate that the service control information and the service data are transmitted on the MBMS-including CC.

2. The method according to claim 1, further comprising: when the related control information is sent, sending, by the network side, in the non-MBMS-including CC, the related control information at a time which is no later than a time when the network side sends, in the CC including an MBMS, the service control information.

3. The method according to claim 1, wherein the related control information comprises Multicast Control Channel (MCCH) information; and the related control information is sent at the same time when the service control information is sent.

4. The method according to claim 3, wherein the related control information further comprises Multicast Channel Scheduling Information (MSI).

5. The method according to claim 2, wherein the related control information comprises: session information of an MBMS that is about to begin, and/or session information of an MBMS that just begins; and a period for modifying the related control information is the same as a period for modifying the service control information.

6. The method according to claim 1, further comprising: when the related control information is sent, adding, by the network side, an identifier in the non-MBMS-including CC to indicate that only the related control information of the MBMS is transmitted on the non-MBMS-including CC.

7. The method according to claim 1, further comprising: determining, by a User Equipment (UE), according to the related control information received by the UE, whether to receive the MBMS.

8. The method according to claim 1, wherein the network side is a Multi-cell/multicast Coordination Entity (MCE), or a base station, or a relay station.

9. A system for transmitting Multimedia Broadcast Multicast Service (MBMS) control information in a multicarrier aggregation system, comprising: a network side and a user equipment (UE), wherein the network side is configured to: when an MBMS needs to be sent, determine an MBMS-including Component Carrier (CC) and a non-MBMS-including CC, and send service control information and service data of the MBMS in the MBMS-including CC, wherein the network side is further configured to: when an MBMS is sent, send, in the non-MBMS-including CC, related control information of the MBMS in the MBMS-including CC, wherein the related control information is used for indicating whether an MBMS a User Equipment (UE) is interested in starts to be sent; and the network side is further configured to: when the service control information and the service data are sent, add an identifier in the MBMS-including CC to indicate that the service control information and the service data are transmitted on the MBMS-including CC.

10. The system according to claim 9, wherein a time when the related control information is sent is no later than a time when the service control information is sent in the MBMS-including CC.

11. The system according to claim 9, wherein
the related control information comprises Multicast Control Channel (MCCH) information; and
the related control information is sent at the same time when the service control information is sent.

12. The system according to claim 11, wherein the related control information further comprises Multicast Channel Scheduling Information (MSI).

13. The system according to claim 10, wherein the related control information comprises: session information of an MBMS that is about to begin, and/or session information of an MBMS that just begins; and
a period for modifying the related control information is the same as a period for modifying the service control information.

14. The system according to claim 9, wherein the network side is further configured to: when the related control information is sent, add an identifier in the non-MBMS-including CC to indicate that only the related control information of the MBMS is transmitted on the non-MBMS-including CC.

15. The system according to claim 9, wherein the UE is configured to determine, according to the related control information received by the UE, whether to receive the MBMS.

16. The system according to claim 9, wherein the network side is a Multi-cell/multicast Coordination Entity (MCE), or a base station, or a relay station.

* * * * *